United States Patent
He et al.

(10) Patent No.: US 11,710,335 B2
(45) Date of Patent: Jul. 25, 2023

(54) HUMAN BODY ATTRIBUTE RECOGNITION METHOD AND APPARATUS, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Keke He, Shenzhen (CN); Jing Liu, Shenzhen (CN); Yanhao Ge, Shenzhen (CN); Chengjie Wang, Shenzhen (CN); Jilin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 78 days.

(21) Appl. No.: 17/504,682

(22) Filed: Oct. 19, 2021

(65) Prior Publication Data
US 2022/0036059 A1 Feb. 3, 2022

Related U.S. Application Data

(63) Continuation of application No. PCT/CN2020/117441, filed on Sep. 24, 2020.

(30) Foreign Application Priority Data

Dec. 11, 2019 (CN) .......................... 201911268088.4

(51) Int. Cl.
*G06V 40/10* (2022.01)
*G06V 10/40* (2022.01)
(Continued)

(52) U.S. Cl.
CPC .......... *G06V 40/103* (2022.01); *G06F 18/217* (2023.01); *G06F 18/25* (2023.01); *G06V 10/40* (2022.01); *G06V 10/98* (2022.01)

(58) Field of Classification Search
CPC .... G06V 40/103; G06V 10/40; G06F 18/217; G06F 18/25
See application file for complete search history.

(56) References Cited

FOREIGN PATENT DOCUMENTS

| CN | 107784282 A | 3/2018 |
|----|----|----|
| CN | 110 008 842 A | 7/2019 |

(Continued)

OTHER PUBLICATIONS

Zhao, Xin, Liufang Sang, Guiguang Ding, Jungong Han, Na Di, and Chenggang Yan. "Recurrent attention model for pedestrian attribute recognition." In Proceedings of the AAAI Conference on Artificial Intelligence, vol. 33, No. 01, pp. 9275-9282. 2019. (Year: 2019).*

(Continued)

*Primary Examiner* — David Perlman
(74) *Attorney, Agent, or Firm* — Crowell & Moring LLP

(57) ABSTRACT

The present disclosure describes human body attribute recognition methods and apparatus, electronic devices, and a storage medium. The method includes acquiring a sample image containing a plurality of to-be-detected areas being labeled with true values of human body attributes; generating, through a recognition model, a heat map of the sample image and heat maps of the to-be-detected areas to obtain a global heat map and local heat maps; fusing the global and the local heat maps to obtain a fused image, and performing human body attribute recognition on the fused image to obtain predicted values; determining a focus area of each type of human body attribute according to the global and the local heat maps; correcting the recognition model by using the focus area, the true values, and the predicted values; and performing, based on the corrected recognition model, human body attribute recognition on a to-be-recognized image.

20 Claims, 7 Drawing Sheets

(51) Int. Cl.
*G06V 10/98* (2022.01)
*G06F 18/25* (2023.01)
*G06F 18/21* (2023.01)

(56) References Cited

FOREIGN PATENT DOCUMENTS

| CN | 110175595 A | 8/2019 |
|---|---|---|
| CN | 110458247 A | 11/2019 |
| CN | 110991380 A | 4/2020 |
| EP | 3 493 105 A1 | 6/2019 |
| JP | 2018151833 A | 9/2018 |
| WO | WO2017170876 A1 | 10/2017 |

OTHER PUBLICATIONS

International Search Report with English translation and Written Opinion regarding PCT/CN2020/117441 dated Apr. 27, 2021, 11 pages.
Extended European Search Report regarding EP 20 897 856.9 dated Jul. 6, 2022, 10 pages.
Tang Chufeng et al: "Improving Pedestrian Attribute Recognition With Weakly-Supervised Multi-Scale Attribute-Specific Localization," 2019 IEEE/CVF International Conference on Computer Vision (ICCV), IEEE, Oct. 27, 2019, pp. 4996-5005.
Yi Dong et al: "Deep Metric Learning for Person Re-identification," 18th International Conference on Pattern Recognition (ICPR'06), IEEE Computer Society, US, Aug. 24, 2014, pp. 34-39.

\* cited by examiner

HUMAN BODY ATTRIBUTE RECOGNITION METHOD AND APPARATUS, ELECTRONIC DEVICE, AND STORAGE MEDIUM

RELATED APPLICATION

This application is a continuation application of PCT Patent Application No. PCT/CN2020/117441, filed on Sep. 24, 2020, which claims priority to Chinese Patent Application No. 201911268088.4, filed with the National Intellectual Property Administration, PRC on Dec. 11, 2019, both of which are incorporated herein by reference in their entireties.

FIELD OF THE TECHNOLOGY

This application relates to the field of computer technologies, and in particular, to a human body attribute recognition method and apparatus, an electronic device, and a storage medium.

BACKGROUND OF THE DISCLOSURE

Human body attribute recognition is recognition on the gender, age, type and color of clothing, and the like of a person, and is widely used in fields such as dangerous behavior early warning, traffic violation monitoring, industrial security, and target person locking in public places such as vending machines, shopping malls, and stations.

In the current human body attribute recognition technology, recognition is first performed on a plurality of human body features of the human body, such as the head, torso, and limbs, and a human body attribute corresponding to each human feature is then recognized. When it is necessary to recognize a plurality of attributes of the human body, for example, when it is necessary to recognize attributes of the head and attributes of the torso of the human body, due to the connectivity between the head and the torso, the head of the human body may be mistakenly recognized as the torso of the human body when recognizing human body features, thus resulting inaccurate results of subsequent human body attribute recognition.

The present disclosure describes embodiments for recognizing human body attributes, addressing at least one of the problems/issues discussed above, thereby improving the accuracy of the human body attribute recognition.

SUMMARY

A human body attribute recognition method and apparatus, an electronic device, and a storage medium are provided in embodiments of this application, which can improve the accuracy of human body attribute recognition.

The present disclosure describes a method for recognizing human body attributes. The method includes acquiring, by a device, a sample image of human body, the sample image containing a plurality of to-be-detected areas, the to-be-detected areas being labeled with true values of human body attributes. The device includes a memory storing instructions and a memory in communication with the memory. The method includes generating, by the device through a recognition model, a heat map of the sample image and heat maps of the to-be-detected areas to obtain a global heat map and local heat maps corresponding to the sample image; fusing, by the device, the global heat map and the local heat maps to obtain a fused image, and performing human body attribute recognition on the fused image to obtain predicted values of human body attribute of the sample image; determining, by the device, a focus area of each type of human body attribute according to the global heat map and the local heat maps; correcting, by the device, the recognition model by using the focus area, the true values of human body attributes, and the predicted values of human body attributes; and performing, by the device based on the corrected recognition model, human body attribute recognition on a to-be-recognized image.

The present disclosure describes an apparatus for recognizing human body attributes. The apparatus includes: a memory storing instructions; and a processor in communication with the memory. When the processor executes the instructions, the processor is configured to cause the apparatus to perform: acquiring a sample image of human body, the sample image containing a plurality of to-be-detected areas, the to-be-detected areas being labeled with true values of human body attributes, generating, through a recognition model, a heat map of the sample image and heat maps of the to-be-detected areas to obtain a global heat map and local heat maps corresponding to the sample image, fusing the global heat map and the local heat maps to obtain a fused image, and performing human body attribute recognition on the fused image to obtain predicted values of human body attribute of the sample image, determining a focus area of each type of human body attribute according to the global heat map and the local heat maps, correcting the recognition model by using the focus area, the true values of human body attributes, and the predicted values of human body attributes, and performing, based on the corrected recognition model, human body attribute recognition on a to-be-recognized image.

The present disclosure describes a non-transitory computer-readable storage medium storing computer-readable instructions. The computer-readable instructions, when executed by a processor, are configured to cause the processor to perform: acquiring a sample image of human body, the sample image containing a plurality of to-be-detected areas, the to-be-detected areas being labeled with true values of human body attributes; generating, through a recognition model, a heat map of the sample image and heat maps of the to-be-detected areas to obtain a global heat map and local heat maps corresponding to the sample image; fusing the global heat map and the local heat maps to obtain a fused image, and performing human body attribute recognition on the fused image to obtain predicted values of human body attribute of the sample image; determining a focus area of each type of human body attribute according to the global heat map and the local heat maps; correcting the recognition model by using the focus area, the true values of human body attributes, and the predicted values of human body attributes; and performing, based on the corrected recognition model, human body attribute recognition on a to-be-recognized image.

Another human body attribute recognition method executed by an electronic device is provided in the embodiments of this application, including:

acquiring a human body image sample containing a plurality of areas to be detected, the areas to be detected being labeled with human body attribute real values;

generating, through a recognition model, a heat map of the human body image sample and heat maps of the areas to be detected to obtain a global heat map and local heat maps corresponding to the human body image sample;

fusing the global heat map and the local heat maps, and performing human body attribute recognition on the fused image to obtain human body attribute predicted values of the human body image sample;

determining a focus area of each type of human body attribute according to the global heat map and the local heat maps;

correcting the recognition model by using the focus area, the human body attribute real values, and the human body attribute predicted values; and performing human body attribute recognition on an image to be recognized based on the corrected recognition model.

Correspondingly, a human body attribute recognition apparatus is further provided in the embodiments of this application, including:

an acquisition module configured to acquire a human body image sample containing a plurality of areas to be detected, the areas to be detected being labeled with human body attribute real values;

a generation module configured to generate, through a recognition model, a heat map of the human body image sample and heat maps of the areas to be detected to obtain a global heat map and local heat maps corresponding to the human body image sample;

a fusing module configured to fuse the global heat map and the local heat maps, and perform human body attribute recognition on the fused image to obtain human body attribute predicted values of the human body image sample;

a determination module configured to determine a focus area of each type of human body attribute according to the global heat map and the local heat maps;

a correction module configured to correct the recognition model by using the focus area, the human body attribute real values, and the human body attribute predicted values; and a recognition module configured to perform human body attribute recognition on an image to be recognized based on the corrected recognition model.

An electronic device is further provided in the embodiments of this application, including a memory, a processor, and a computer program stored in the memory and executable on the processor, where when executing the program, the processor implements the operations of the above human body attribute recognition method.

A computer-readable storage medium storing a computer program is further provided in the embodiments of this application, where the computer program, when processed by a processor, implements the operations of the above human body attribute recognition method.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

The technical solutions in the embodiments of this application are clearly and completely described below with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

A human body attribute recognition method and apparatus, an electronic device, and a storage medium are provided in the embodiments of this application.

The human body attribute recognition apparatus may be specifically integrated in a terminal or a server. The terminal may include a mobile phone, a tablet computer, a personal computer (PC), or a monitoring device. The server may include a stand-alone server or a distributed server, and may also include a server cluster composed of a plurality of servers.

Figure 1A:
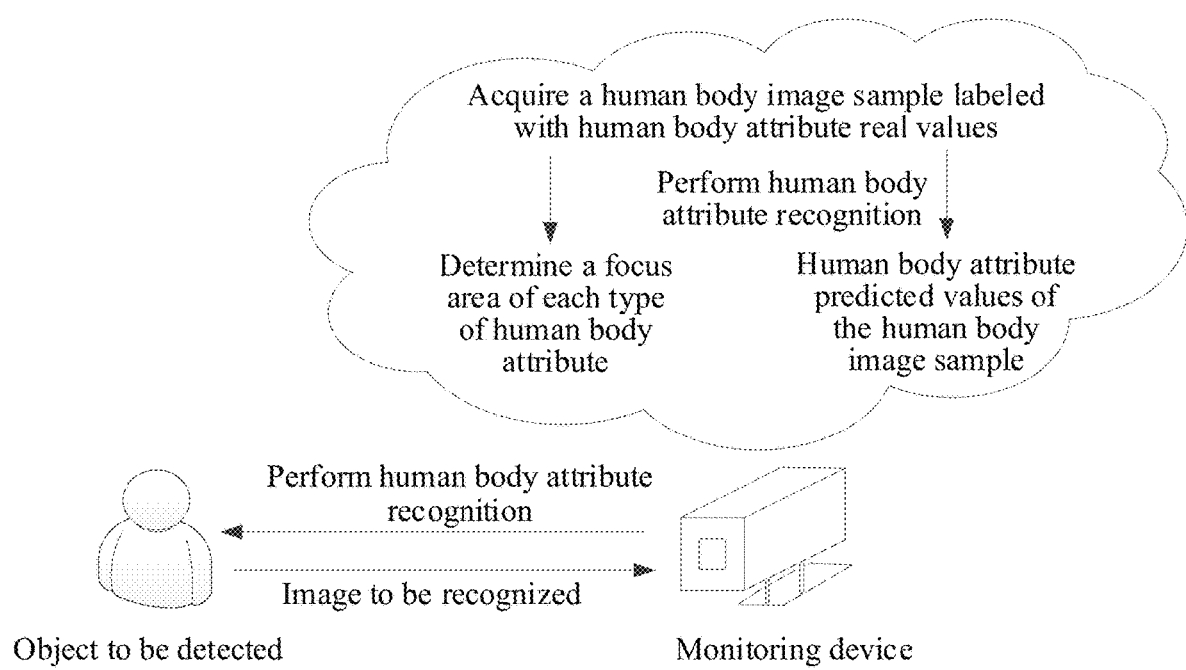
FIG. 1A is a schematic diagram of a scenario of a human body attribute recognition method according to an embodiment of this application.

For example, please refer to FIG. 1A, the human body attribute recognition apparatus is integrated in a monitoring device. The monitoring device may include a camera. First, the monitoring device may acquire a plurality of human body image samples, where each area to be detected is labeled with a human body attribute real value. Then, the monitoring device generates, through a recognition model, a heat map of the human body image sample and heat maps of the areas to be detected to obtain a global heat map and local heat maps corresponding to the human body image sample, fuse the global heat map and the local heat maps, and perform human body attribute recognition on the fused image to obtain human body attribute predicted values of the human body image sample. Then, the monitoring device may determine a focus area of each type of human body attribute according to the global heat map and the local heat maps. Finally, the monitoring device may correct the recognition model by using the focus area, the human body attribute real values, and the human body attribute predicted values. When a criminal suspect enters an area monitored by the monitoring device, there are pedestrians in the monitored area, and it is learned that the criminal suspect is wearing a white shirt, black trousers, and red shoes. At this time, the monitoring device may perform human body attribute recognition on an image captured by the camera based on the corrected recognition model, so as to recognize the criminal suspect in the crowd.

In this solution, the recognition model is corrected by using the focus area, the human body attribute real values, and the human body attribute predicted values, and then the human body attribute recognition is performed on the image to be recognized based on the corrected recognition model. In other words, when the human body attribute recognition is performed, the focus area of each type of human body attribute will be considered, so that each attribute can better focus on the area that it needs to focus on, thereby improving the accuracy of the human body attribute recognition.

Detailed descriptions are separately performed below. A description order of the following embodiments is not construed as a limitation on a preferred order of the embodiments.

Figure 4:
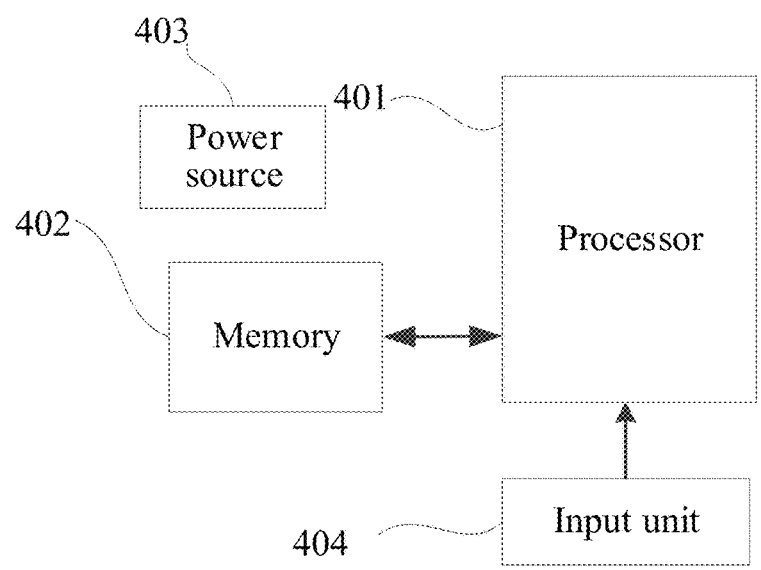
FIG. 4 is a schematic structural diagram of an electronic device according to an embodiment of this application.

A human body attribute recognition method, which may be executed by the electronic device shown in FIG. 4, includes: acquiring a human body image sample containing a plurality of areas to be detected, the areas to be detected being labeled with human body attribute real values, generating, through a recognition model, a heat map of the human body image sample and heat maps of the areas to be detected to obtain a global heat map and local heat maps corresponding to the human body image sample; fusing the global heat map and the local heat maps, and performing human body attribute recognition on the fused image to obtain human body attribute predicted values of the human body image sample; determining a focus area of each type of human body attribute according to the global heat map and local heat maps, correcting the recognition model by using the focus area, the human body attribute real values, and the human body attribute predicted values, and performing human body attribute recognition on an image to be recognized based on the corrected recognition model.

Figure 1B:
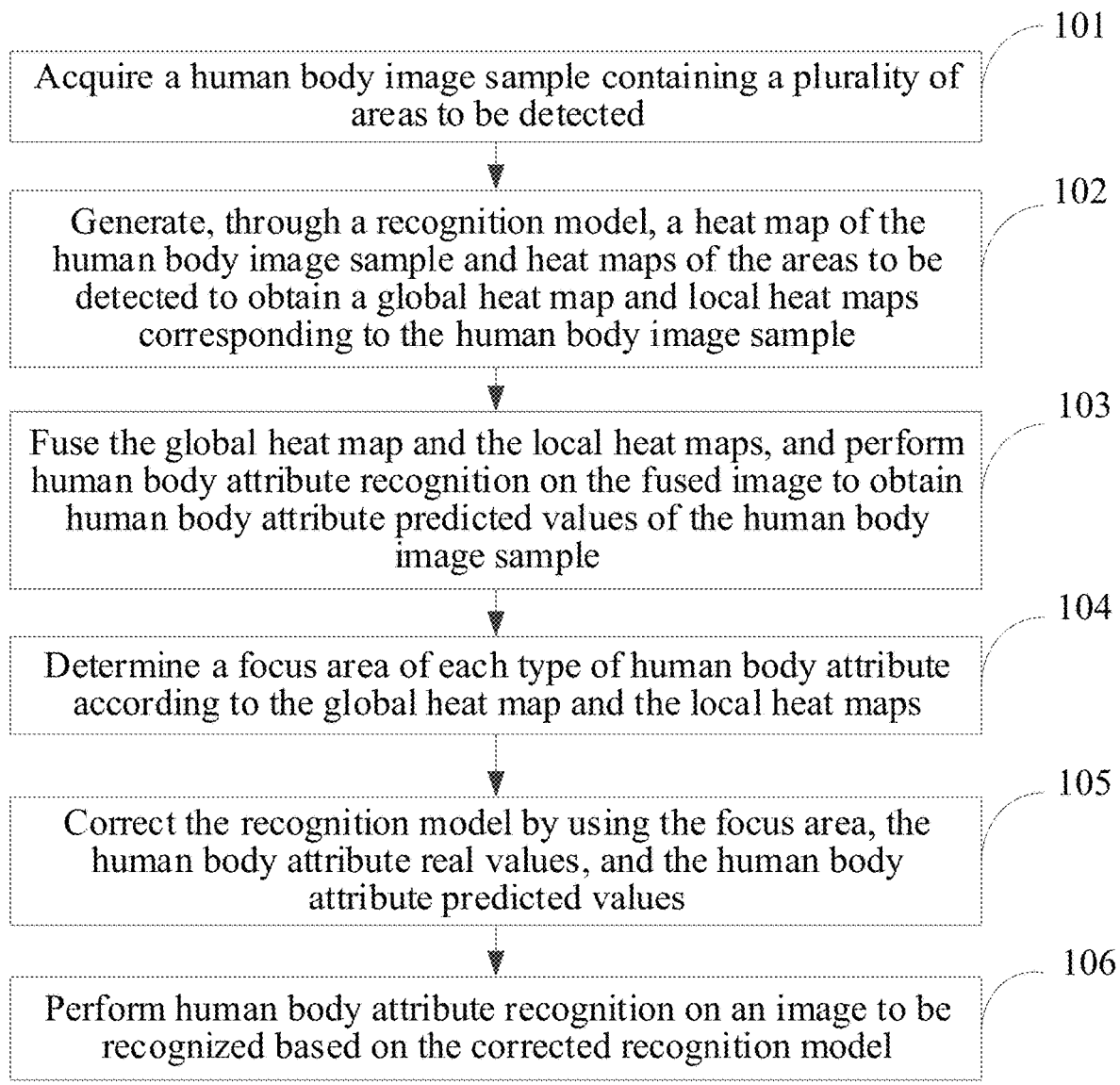
FIG. 1B is a schematic flowchart of a human body attribute recognition method according to an embodiment of this application.

FIG. 1B is a schematic flowchart of a human body attribute recognition method according to an embodiment of this application. The human body attribute recognition method may be executed by the electronic device shown in FIG. 4, and the specific process may include the following steps:

Step 101: Acquire a human body image sample containing a plurality of areas to be detected.

The human body image sample is an image of a sample human body, and the areas to be detected are labeled with human body attribute real values. The human body image sample may be pre-stored locally, or may be drawn by accessing a network interface, or may be captured in real time by a camera, depending on an actual situation.

In some implementations, a human body image sample may be called as a sample image of human body; a plurality of areas to be detected may be called as a plurality of to-be-detected areas, and/or human body attribute real values may be called as true values of human body attributes.

In some implementations, step 101 may include acquiring a sample image of human body, the sample image containing a plurality of to-be-detected areas, the to-be-detected areas being labeled with true values of human body attributes.

The human body image sample may be divided into areas according to feature points corresponding to the sample human body. That is, in some embodiments, the step of "acquiring a human body image sample containing a plurality of areas to be detected" may specifically include:

(11) acquiring a human body image sample containing a sample human body;

(12) performing human body feature point recognition on the human body image sample to obtain a second feature point set corresponding to the sample human body; and

(13) dividing the sample human body into areas based on the second feature point set to obtain a plurality of areas to be detected corresponding to the sample human body.

Specifically, key feature points of the sample human body in the human body image sample may be detected. For example, 14 key feature points (that is, the second feature points) are detected, and then the sample human body is divided into areas based on the 14 key feature points to obtain a head area of the sample human body, a torso area of the sample human body, and a limbs area of the sample human body, that is, three areas to be detected are obtained.

Step 102: Generate, through a recognition model, a heat map of the human body image sample and heat maps of the areas to be detected to obtain a global heat map and local heat maps corresponding to the human body image sample.

In some implementations, step 102 may include generating, through a recognition model, a heat map of the sample image and heat maps of the to-be-detected areas to obtain a global heat map and local heat maps corresponding to the sample image.

Here, the concept of a heat map is introduced first. As a kind of density map, the heat map generally uses a method with significant color differences to present data effects. A bright color in the heat map generally represents a higher occurrence frequency of an event or a larger distribution density of things, and a dark color is the opposite. In this embodiment of this application, the global heat map is used for representing heat information of the sample human body in the human body image sample, and the local heat map is used for representing heat information of the sample human body in the area to be detected.

Feature extraction may be performed on the human body image sample and the areas to be detected through a human body feature recognition sub-network in the recognition model to obtain the global heat map corresponding to the human body image sample and the local heat maps corresponding to the areas to be detected.

The human body feature recognition sub-network may include:

A convolutional layer mainly used for performing feature extraction on an inputted image (such as a training sample or an image that needs to be recognized). The size of a convolution kernel and the quantity of convolution kernels may be determined according to an actual application. For example, the size of the convolution kernel from the first convolutional layer to the fourth convolutional layer may be (7, 7), (5, 5), (3, 3), and (3, 3), respectively. In order to reduce the computational complexity and increase the computing efficiency, in this embodiment, the size of the convolution kernel of the four convolutional layers may be set to (3, 3), activation functions all adopt "relu (Rectified Linear Unit)", and a padding (padding refers to the space between an attribute definition element border and element content) method is set to "same", the "same" padding method may be simply understood as padding blanks with 0, and the number of zeros filled on the left (top) is the same as the number of zeros filled on the right (bottom) or is less by one. The convolutional layers may be directly connected to each other to accelerate the network convergence speed. In order to further reduce the computing amount, a down-sampling (pooling) operation may be performed on all layers or any one or two layers in the second to fourth convolutional layers. The down-sampling operation is basically the same as the convolution operation, except that the convolution kernel for the down-sampling only takes a maximum value (max pooling) or an average value (average pooling) of the corresponding position, etc. For the convenience of description, in the embodiments of this application, illustration is made by taking performing the down-sampling operation in both the second convolutional layer and the third convolutional layer, and the down-sampling operation being specifically the max pooling as an example.

For the convenience of description, in this embodiment of this application, the layer where the activation function is located and the down-sampling layer (also referred to as a pooling layer) are all included in the convolutional layer. It is understandable that the structure may also be considered as including the convolutional layer, the layer where the activation function is located, the down-sampling layer (i.e., the pooling layer), and a fully connected layer. Of course, an input layer for inputting data and an output layer for outputting data may also be included, which will not be elaborated here.

Fully connected layer: It may map learned features to a sample label space, and mainly acts as a "classifier" in the entire convolutional neural network. Each node of the fully connected layer is connected to all nodes of an output of the previous layer (such as the down-sampling layer in the convolutional layer). A node in the fully connected layer is referred to as a neuron in the fully connected layer. The quantity of neurons in the fully connected layer may be determined according to actual application requirements. For example, in the human body attribute recognition model, the quantity of neurons in the fully connected layer may be set to 512, or may also be set to 128, and so on. Similar to the convolutional layer, in the fully connected layer, a nonlinear factor may also be added by adding an activation function. For example, an activation function sigmoid (an S-type function) may be added.

Step 103: Fuse the global heat map and the local heat maps, and perform human body attribute recognition on the fused image to obtain human body attribute predicted values of the human body image sample.

In some implementations, step 103 may include fusing the global heat map and the local heat maps to obtain a fused image, and performing human body attribute recognition on the fused image to obtain predicted values of human body attribute of the sample image.

First, the size of the global heat map and the size of the local heat maps may be respectively compressed to a preset size, and then the compressed global heat map and the compressed local heat maps are stitched to obtain a fused image. The human body attribute recognition is performed on the fused image based on the recognition model to obtain the human body attribute predicted values of the human body image sample, where the human body attribute predicted values is the probability that each pixel in the human body image sample belongs to the human body.

Step 104: Determine a focus area of each type of human body attribute according to the global heat map and the local heat maps.

In order to further improve the accuracy of the recognition model in recognizing the human body attribute, for example, if the human body attribute to be recognized is the attribute of black hair, an area that the recognition model needs to focus on is the head area of the human body, that is, the head area is the focus area corresponding to the attribute of black hair. For another example, the human body attributes to be recognized are the attributes of white clothes and blue shoes, then the areas that the recognition model needs to focus on are the torso area of the human body and the lower limbs area of the human body. Therefore, the focus area of each type of human body attribute may be determined through the global heat map and the local heat maps. In some embodiments, the step of "determining a focus area of each type of human body attribute according to the global heat map and the local heat maps" may specifically include:

(21) generating a class activation map corresponding to each type of human body attribute according to the global heat map and the local heat maps; and

(22) correcting the class activation map, and determining the focus area of each type of human body attribute based on a result of the correction.

The class activation map is also a kind of heat map, but differs from the aforementioned global heat map and local heat map in that the class activation map is a heat map used for highlighting a certain type of specific area. Specifically, the position of a local heat map correspondingly in the global heat map may be acquired, and human body attributes related to the local heat map are determined based on the position information. For example, the position of a local heat map A correspondingly in the global heat map is the head area, and then the local heat map A is related to the attributes of hair, hat, and earrings, while the attributes of clothes, shoes, and watches will not be recognized from the head area. After the human body attributes corresponding to the local heat maps are determined, a class activation map corresponding to each type of human body attribute may be generated based on the global heat map and the local heat maps.

In some embodiments, the global heat map may be vectorized to obtain a feature vector corresponding to the global heat map. Then, the human body attributes focused by the local heat maps are determined based on the distribution of the local heat maps in the global heat map, and weight matrixes corresponding to the local heat maps are generated according to the human body attributes focused by the local heat maps. Finally, products of the feature vector and the weight matrixes are calculated respectively to obtain the class activation map corresponding to each type of human body attribute. That is, the step of "generating a class activation map corresponding to each type of human body attribute according to the global heat map and the local heat maps" may specifically include:

(31) vectorizing the global heat map to obtain a feature vector corresponding to the global heat map;

(32) determining, based on the distribution of the local heat maps in the global heat map, human body attributes focused by the local heat maps;

(33) generating weight matrixes corresponding to the local heat maps according to the human body attributes focused by the local heat maps; and

(34) calculating products of the feature vector and the weight matrixes respectively to obtain the class activation map corresponding to each type of human body attribute.

For example, after a training image sample passing through the human body feature sub-network in the recognition model, a global heat map with the size of $Q*R*E$ may be outputted, where Q is the number of channels, R is the width of the heat map, and E is the height of the heat map. Assuming that the output is $2048*8*24$, it is equivalent to that there is 2048 global heat maps. Then, after all the global heat maps are globally pooled, a 2048-dimensional feature vector is obtained. Then, according to the human body attributes focused by the local heat maps, weight matrixes W corresponding to the local heat maps are generated. Finally, products of the feature vector and the weight matrixes W are calculated respectively to obtain the class activation map corresponding to each type of human body attribute. For example, for a certain type of human body attribute, the class activation map corresponding to the human body attribute may be expressed by the following formula:

$$I = W_1 * D_1 + W_2 * D_2 + \ldots + W_n * D_i$$

Where, I represents the class activation map corresponding to the human body attribute, $W_n$ represents the weight matrix corresponding to the n-th local heat map, and $D_i$ represents the i-th global heat map.

The generated class activation map may show that the focus area is too large, covering some areas that would not be focused on. For example, the area that the black hair attribute needs to focus on is the head area. However, in the generated class activation map, the focus area covers a part of the torso area of the human body. Therefore, it is necessary to correct the class activation map and determine the focus area of each type of human body attribute based on a result of the correction.

There may be many methods to correct the class activation map. In this application, the global heat map and the local heat maps may be mirrored respectively, and the focus area of each type of human body attribute may be determined based on the processed global heat map and the processed local heat maps. That is, the step of "correcting the class activation map, and determining the focus area of each type of human body attribute based on a result of the correction" may specifically include:

(41) mirroring the global heat map and the local heat maps respectively to obtain the processed global heat map and the processed local heat maps; in some implementations, the processed global heat map may be called as the mirrored global heat map, and/or the processed local heat maps may be called as the mirrored local heat maps.

(42) generating the mirrored class activation map of each type of human body attribute based on the processed global heat map and the processed local heat maps; and

(43) determining the focus area of each type of human body attribute according to the class activation map and the mirrored class activation map.

For the same image P, a class activation map of the mirrored image P is the same as a result obtained after mirroring a class activation map of the image P. Therefore, the area focused by the class activation map may be adjusted by using the mirrored class activation map, thereby determining the focus area of each type of human body attribute.

For example, a focus area of the class activation map may be determined through feature points of the class activation map, a focus area of the mirrored class activation map is determined through the feature points of the mirrored class activation map, the focus area of the class activation map is adjusted according to the focus area of the mirrored class activation map, and then the focus area of each type of human body attribute is determined. That is, the step of "determining the focus area of each type of human body attribute according to the class activation map and the mirrored class activation map" may specifically include:

(51) acquiring feature points of the class activation map and feature points of the mirrored class activation map respectively to obtain a plurality of first feature points corresponding to the class activation map and a plurality of second feature points corresponding to the mirrored class activation map, each first feature point corresponding to a second feature point;

(52) extracting heat values of the first feature points to obtain first heat values corresponding to the first feature points, and extracting heat values of the second feature points to obtain second heat values corresponding to the second feature points; and

(53) constructing the focus area of each type of human body attribute based on the first heat values and the second heat values.

A focus area of the class activation map may be determined according to the first heat values. For example, when a certain first heat value is greater than a preset threshold, a first feature point corresponding to the first heat value is located in the focus area of the class activation map. The first feature point corresponding to the first heat value greater than the preset threshold is determined as a first reference point, and then a first reference area of a human body attribute corresponding to the first reference point is constructed. Similarly, the method of determining a focus area of the mirrored class activation map according to the second heat values is also similar. Of course, because the mirrored class activation map is obtained based on the processed global heat map and the processed local heat maps, in other words, each second feature point has a corresponding first feature point in the class activation map. That is, in some embodiments, the step of "constructing the focus area of each type of human body attribute based on the first heat values and the second heat values may specifically include:

(61) detecting whether each first heat value meets a preset condition; in some implementations, this step may include determining whether each first heat value meets a preset condition.

(62) selecting a first feature point that meets the preset condition from the plurality of first feature points to obtain a first reference point; in some implementations, this step may include, in response to determining that a first feature point meets the preset condition, selecting the first feature point that meets the preset condition from the plurality of first feature points to obtain a first reference point and/or the following steps.

(63) constructing a first reference area of a human body attribute corresponding to the first reference point;

(64) acquiring a second feature point corresponding to the first reference point to obtain a second reference point;

(65) constructing a second reference area of a human body attribute corresponding to the second reference point;

(66) mirroring the second reference area to obtain the processed second reference area; and

(67) adjusting the size of the first reference area through the processed second reference area to obtain the focus area of the human body attribute.

After the focus area of each type of human body attribute is determined, step 105 is performed. The sequence of step 103 and step 104 is not limited.

Step 105: Correct the recognition model by using the focus area, the human body attribute real values, and the human body attribute predicted values.

In some implementations, step 105 may include correcting the recognition model by using the focus area, the true values of human body attributes, and the predicted values of human body attributes.

In this application, the idea of correcting the class activation map is: for a certain human body attribute of a human body image C, a class activation function outputted by the human body image C is equal to a class activation function outputted by the mirrored human body image C, that is, $CAM(C)=CAM(F(C))$.

$CAM(C)$ represents the class activation function of the human body image C, and $CAM(F(C))$ represents the class activation function of the mirrored human body image C after the human body image C is mirrored by the F function. In other words, a corresponding loss function Lcam of the focus area is $$Lcam = |FCAM(C) - CAM(F(C))|^2$$

In another representation, a corresponding loss function Lcam of the focus area may be Lcam=|F(CAM(C))−CAM(F(C))|².

Further, the loss function of the recognition model is calculated according to the human body attribute real values and the human body attribute predicted values, and the recognition model is corrected based on the calculated loss function and the corresponding loss function of the focus area. That is, in some embodiments, the step of "correcting the recognition model by using the focus area, the human body attribute real values, and the human body attribute predicted values" may specifically include:

(71) calculating a loss function of the recognition model based on the human body attribute real values and the human body attribute predicted values to obtain a first loss function;

(72) acquiring a loss function corresponding to the focus area through the recognition model to obtain a second loss function;

(73) superimposing the first loss function and the second loss function to obtain a target loss function of the recognition model; and

(74) correcting the recognition model through the target loss function.

For example, specifically, the loss function of the recognition model is calculated based on the human body attribute real values and the human body attribute predicted values to obtain the first loss function, and the first loss function may be expressed by the following formula:

$$Lpred = -\frac{1}{K}\sum_{k}^{K}\sum_{j}^{J} u_{kj}\log(S) + (1 - u_{kj})\log(1 - S)$$

$$S = \frac{1}{1 + e^{-X_{kj}}}$$

Where, k represents an index for focus areas, K represents a quantity of focus areas, j represents an index for the category of human body attributes, J represents a quantity of categories of human body attributes, $u_{kj}$ is the human body attribute real value, for representing the true probability of the k-th focus area belonging to the j-th human body attribute, $X_{kj}$ is the human body attribute predicted values, for representing the prediction probability of the k-th focus area belonging to the j-th human body attribute, e is a natural constant, and log is a logarithm function. In some implementations, the final target loss function is equal to the sum of the first loss function and the second loss function, that is, L=Lcam+Lpred.

Step 106: Perform human body attribute recognition on an image to be recognized based on the corrected recognition model.

In some implementations, step 106 may include performing, based on the corrected recognition model, human body attribute recognition on a to-be-recognized image.

For example, specifically, the human body attribute recognition is performed on the image to be recognized through the corrected recognition model to obtain a human body attribute recognition result of a human body to be recognized in the image to be recognized. For example, recognizable human body attributes of the human body to be recognized are white shirt, blue pants, black shoes, and the like. Specifically, human body feature point recognition may be performed for the image to be recognized containing the human body to be recognized to obtain 14 feature points corresponding to the human body to be recognized. Then, based on the 14 feature points, the human body to be recognized is divided into areas to obtain a plurality of areas to be detected corresponding to the human body to be recognized. Finally, the human body attribute recognition is performed on the image to be recognized through the corrected recognition model based on the plurality of areas to be detected. That is, in some embodiments, the step of "performing human body attribute recognition on an image to be recognized based on the corrected recognition model" may specifically include:

(81) acquiring the image to be recognized containing the human body to be recognized;

(82) performing human body feature point recognition on the image to be recognized to obtain a first feature point set corresponding to the human body to be recognized;

(83) dividing the human body to be recognized into areas based on the first feature point set to obtain a plurality of areas to be detected corresponding to the human body to be recognized; and

(84) performing human body attribute recognition on the plurality of areas to be detected respectively through the corrected recognition model.

In this embodiment of this application, after a human body image sample containing a plurality of areas to be detected is acquired, the areas to be detected being labeled with a human body attribute real values, a heat map of the human body image sample and heat maps of the areas to be detected are generated through a recognition model to obtain a global heat map and local heat maps corresponding to the human body image sample; then the global heat map and the local heat maps are fused, and human body attribute recognition is performed on the fused image to obtain human body attribute predicted values of the human body image sample; then a focus area of each type of human body attribute is determined according to the global heat map and the local heat maps, the recognition model is corrected by using the focus area, the human body attribute real values, and the human body attribute predicted values, and finally, the human body attribute recognition is performed on an image to be recognized based on the corrected recognition model. In this solution, the recognition model is corrected by using the focus area, the human body attribute real values, and the human body attribute predicted values, and then the human body attribute recognition is performed on the image to be recognized based on the corrected recognition model. In other words, when the human body attribute recognition is performed, the focus area of each type of human body attribute will be considered, so that each attribute can better focus on the area that it needs to focus on, thereby improving the accuracy of the human body attribute recognition.

According to the method described in this embodiment, the following further performs detailed description by using an example.

In this embodiment, the description will be made by taking a human body attribute recognition apparatus specifically integrated in a terminal as an example.

Figure 2A:
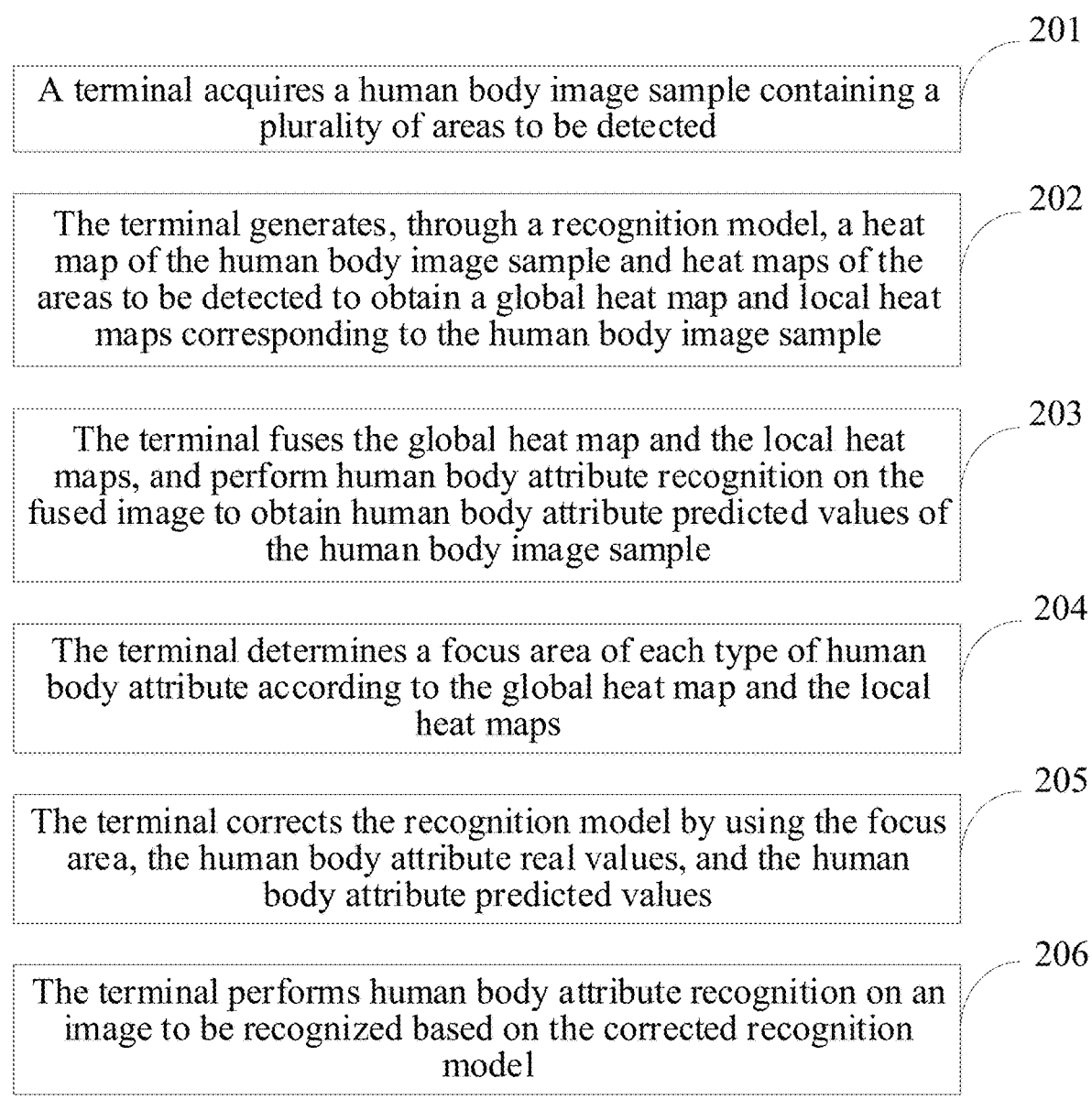
FIG. 2A is another schematic flowchart of a human body attribute recognition method according to an embodiment of this application.

Please refer to FIG. 2A, a human body attribute recognition method may be executed by the electronic device shown in FIG. 4. The specific process may include the following steps:

Step 201: Acquire, by a terminal, a human body image sample containing a plurality of areas to be detected.

The human body image sample is an image of a sample human body, and the areas to be detected are labeled with human body attribute real values. The human body image sample may be pre-stored locally, or may be obtained by accessing a network interface, or may be drawn in real time by a camera, depending on an actual situation.

Step 202: Generate, by the terminal through a recognition model, a heat map of the human body image sample and heat maps of the areas to be detected to obtain a global heat map and local heat maps corresponding to the human body image sample.

Feature extraction may be performed by the terminal on the human body image sample and the areas to be detected through a human body feature recognition sub-network in the recognition model to obtain the global heat map corresponding to the human body image sample and the local heat maps corresponding to the areas to be detected.

Step 203: Fuse, by the terminal, the global heat map and the local heat maps, and perform human body attribute recognition on the fused image to obtain human body attribute predicted values of the human body image sample.

The size of the global heat map and the size of the local heat maps may be respectively compressed by the terminal to a preset size, and then the compressed global heat map and the compressed local heat maps are stitched to obtain a fused image. The human body attribute recognition is performed on the fused image based on the recognition model to obtain the human body attribute predicted values of the human body image sample, where the human body attribute predicted values is the probability that each pixel in the human body image sample belongs to the human body.

Step 204: Determine, by the terminal, a focus area of each type of human body attribute according to the global heat map and the local heat maps.

For example, if the human body attribute to be recognized by the terminal is the attribute of black hair, an area that the recognition model needs to focus on is the head area of the human body, that is, the head area is the focus area corresponding to the attribute of black hair. For another example, the human body attributes to be recognized by the terminal are the attributes of white clothes and blue shoes, then the areas that the recognition model needs to focus on are the torso area of the human body and the lower limbs area of the human body. Therefore, the focus area of each type of human body attribute may be determined through the global heat map and the local heat maps.

Step 205: Correct, by the terminal, the recognition model by using the focus area, the human body attribute real values, and the human body attribute predicted values.

For example, the terminal calculates a loss function corresponding to the recognition model according to the human body attribute real values and the human body attribute predicted values to obtain a first loss function. At the same time, the terminal acquires a corresponding loss function of the focus area to obtain a second loss function. Then, the first loss function and the second loss function are superimposed by the terminal to obtain a target loss function of the recognition model. Finally, the recognition model is corrected by the terminal through the target loss function.

Step 206: Perform, by the terminal, human body attribute recognition on an image to be recognized based on the corrected recognition model.

For example, specifically, the human body attribute recognition may be performed by the terminal on the image to be recognized through the corrected recognition model to obtain a human body attribute recognition result of a human body to be recognized in the image to be recognized. For example, the recognizable human body attributes of the human body to be recognized are white shirt, blue pants, black shoes, and the like. Specifically, human body feature point recognition may be performed for the image to be recognized containing the human body to be recognized to obtain 14 feature points corresponding to the human body to be recognized. Then, based on the 14 feature points, the human body to be recognized is divided into areas to obtain a plurality of areas to be detected corresponding to the human body to be recognized. Finally, the human body attribute recognition is performed on the image to be recognized through the corrected recognition model based on the plurality of areas to be detected.

In this embodiment of this application, after a human body image sample containing a plurality of areas to be detected is acquired by the terminal, the areas to be detected being labeled with human body attribute real values, a heat map of the human body image sample and heat maps of the areas to be detected are generated by the terminal through a recognition model to obtain a global heat map and local heat maps corresponding to the human body image sample; then the global heat map and the local heat maps are fused by the terminal, and human body attribute recognition is performed on the fused image to obtain human body attribute predicted values of the human body image sample; then a focus area of each type of human body attribute is determined by the terminal according to the global heat map and the local heat maps, the recognition model is corrected by the terminal using the focus area, the human body attribute real values, and the human body attribute predicted values, and finally, the human body attribute recognition is performed on the image to be recognized by the terminal based on the corrected recognition model. The recognition model is corrected by the terminal of this application by using the focus area, the human body attribute real values, and the human body attribute predicted values, and then the human body attribute recognition is performed on the image to be recognized based on the corrected recognition model. In other words, when the human body attribute recognition is performed by the terminal, the focus area of each type of human body attribute will be considered, so that each attribute can better focus on the area that it needs to focus on, thereby improving the accuracy of the human body attribute recognition.

Figure 2B:
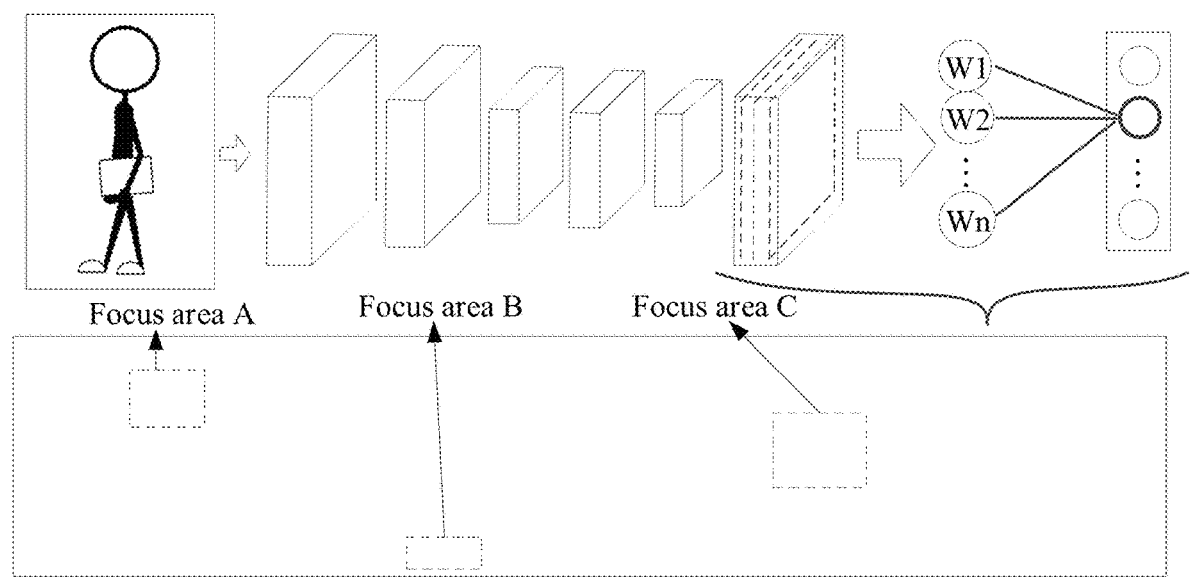
FIG. 2B is a schematic diagram of generating a class activation map in a human body attribute recognition method according to an embodiment of this application.
Figure 2C:
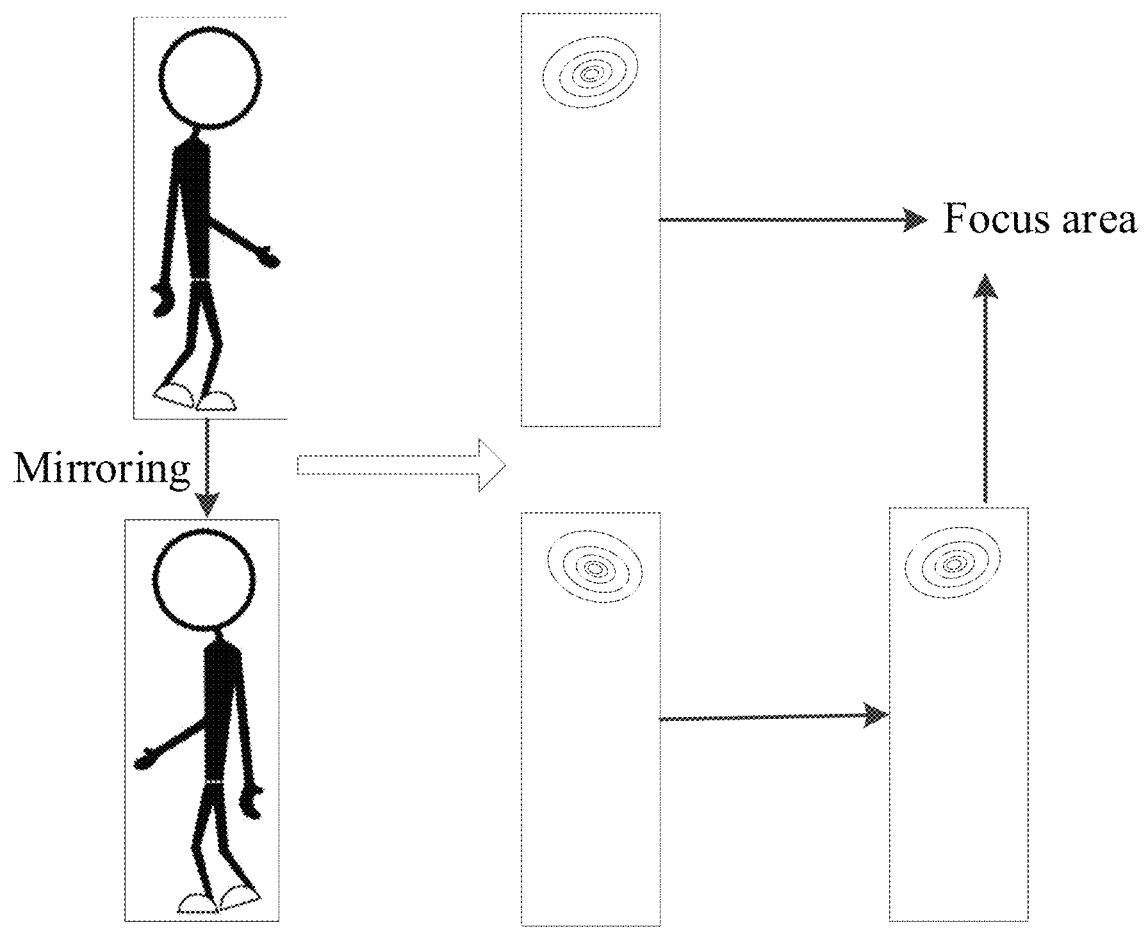
FIG. 2C is a schematic diagram of adjusting a class activation map through the mirrored class activation map in a human body attribute recognition method according to an embodiment of this application.
Figure 2D:
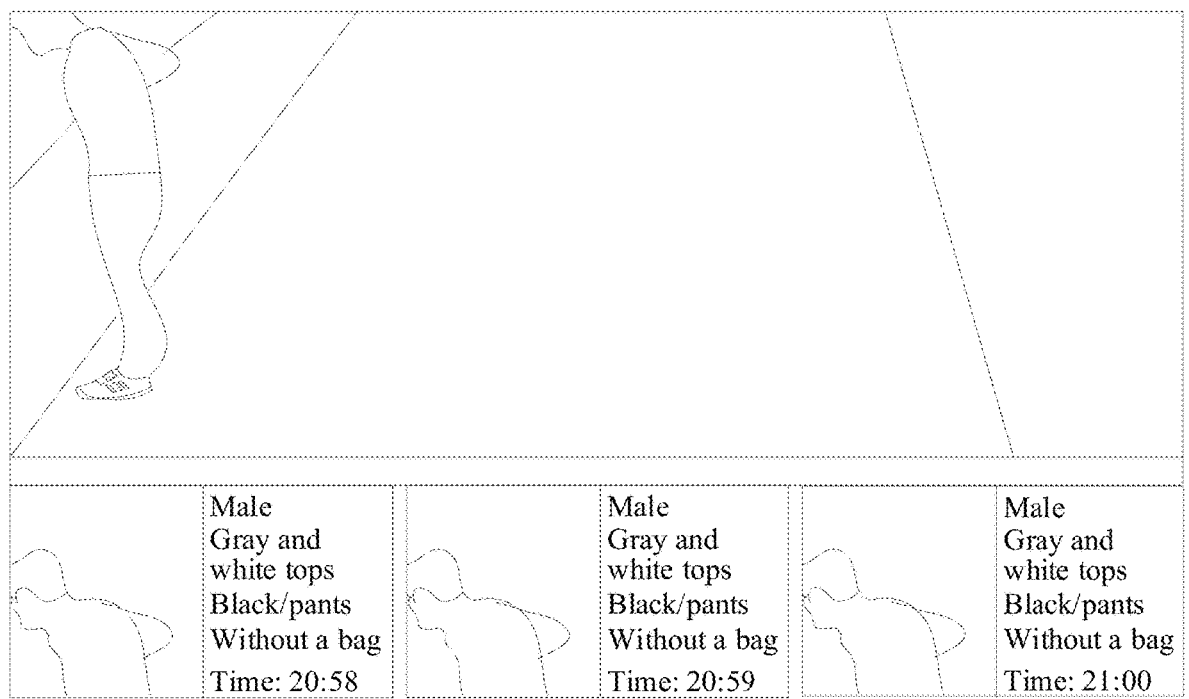
FIG. 2D is a schematic diagram of a page corresponding to a recognition result according to an embodiment of this application.

In order to facilitate the understanding of the human body attribute recognition method provided by the embodiments of this application, a monitoring scenario is used as an example, and the scenario may include a monitoring device and a terminal connected to the monitoring device. In a training phase, the terminal may receive a plurality of images uploaded by the monitoring device, and select a human body image sample containing a sample human body for model training from the plurality of images. Then, the terminal may label a human body attribute real value on the human body image sample. Then, the terminal may detect human body key points on the human body image sample to obtain 14 key points corresponding to the sample human body, and divide the sample human body into areas by using the 14 key points to obtain a head area, an upper body area, and a lower body area corresponding to the sample human body. The terminal inputs the human body image sample into a recognition model to obtain a global heat map corresponding to the human body image sample and local heat maps corresponding to the divided areas. Then, the terminal generates weight matrixes corresponding to the local heat maps according to human body attributes of the local heat maps, and calculates products of a feature vector and the weight matrixes respectively to obtain a class activation map corresponding to each type of human body attribute, as shown in FIG. 2B. It is understandable that different human body attributes need to focus on different areas. For example, in order to recognize a hat style, an area that requires focus is a focus area A, and there is no need to recognize a human body attribute of a focus area B and a human body attribute of a focus area C. At the same time, the terminal may fuse the global heat map and the local heat maps, and perform human body attribute recognition on the fused image to obtain human body attribute predicted values of the human body image sample. Then, the terminal mirrors the global heat map and the local heat maps respectively to obtain the processed global heat map and the processed local heat maps, and generates the mirrored class activation map corresponding to each type of human body attribute based on the processed global heat map and the processed local heat maps. Then, the terminal adjusts the class activation map through the mirrored class activation map to obtain a result of the adjustment, as shown in FIG. 2C. Then, the terminal corrects the recognition model based on the result of the adjustment, the human body attribute real value, and the human body attribute predicted values. Finally, the terminal performs human body attribute recognition on an image to be recognized based on the corrected recognition model, and a page corresponding to a result of the recognition may be displayed on a display screen of the terminal, as shown in FIG. 2D.

In order to facilitate better implementation of the human body attribute recognition method according to this embodiment of this application, a human body attribute recognition apparatus (recognition apparatus for short) based on the above method is further provided in the embodiments of this application. The meanings of the nouns are the same as those in the above human body attribute recognition method, and specific implementation details may be obtained with reference to the description in the method embodiment.

Figure 3:
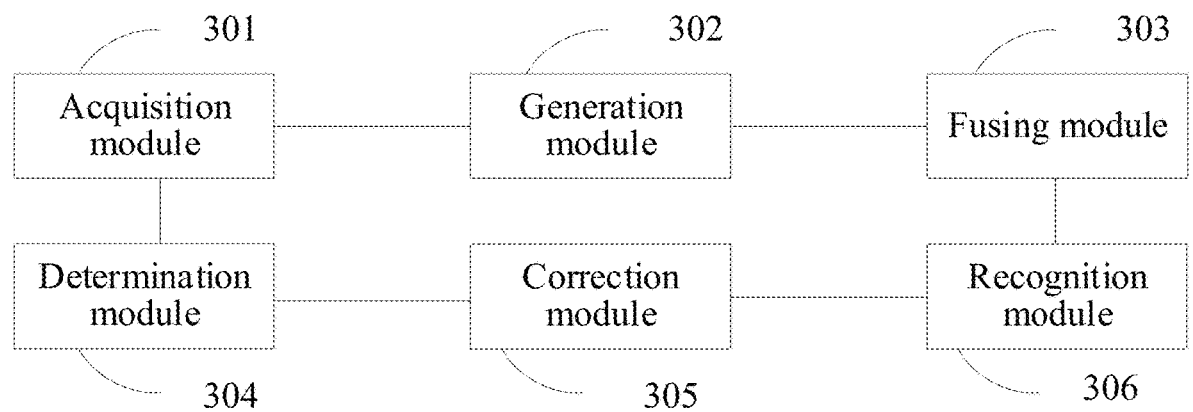
FIG. 3 is a schematic structural diagram of a human body attribute recognition apparatus according to an embodiment of this application.

Please refer to FIG. 3, FIG. 3 is a schematic structural diagram of a human body attribute recognition apparatus according to an embodiment of this application. The recognition apparatus may include an acquisition module 301, a generation module 302, a fusing module 303, a determination module 304, a correction module 305, and a recognition module 306, which may be specifically as follows.

The acquisition module 301 is configured to acquire a human body image sample containing a plurality of areas to be detected.

The human body image sample is an image of a sample human body, and the areas to be detected are labeled with human body attribute real values. The human body image sample may be pre-stored locally, or may be obtained by accessing a network interface, or may be drawn in real time by a camera, depending on an actual situation.

In some embodiments, the acquisition module 301 is specifically configured to: acquire a human body image sample containing a sample human body, perform human body feature point recognition on the human body image sample to obtain a second feature point set corresponding to the sample human body, and divide the sample human body into areas based on the second feature point set to obtain a plurality of areas to be detected corresponding to the sample human body.

The generation module 302 is configured to generate a heat map of the human body image sample and heat maps of the areas to be detected through a recognition model to obtain a global heat map and local heat maps corresponding to the human body image sample.

The generation module 302 may perform feature extraction on the human body image sample and the areas to be detected through a human body feature recognition sub-network in the recognition model to obtain a global heat map corresponding to the human body image sample and local heat maps corresponding to the areas to be detected.

The fusing module 303 is configured to fuse the global heat map and the local heat maps, and perform human body attribute recognition on the fused image to obtain human body attribute predicted values of the human body image sample.

For example, the fusing module 303 may compress the size of the global heat map and the size of the local heat map to a preset size respectively, then stitch the compressed global heat map and the compressed local heat map to obtain the fused image, and perform human body attribute recognition on the fused image based on the recognition model to obtain the human body attribute predicted values of the human body image sample, where the human body attribute predicted values is the probability that each pixel in the human body image sample belongs to the human body.

The determination module 304 is configured to determine a focus area of each type of human body attribute according to the global heat map and the local heat maps.

In some embodiments, the determination module 304 may specifically include:

a generation sub-module configured to generate a class activation map corresponding to each type of human body attribute based on the global heat map and the local heat maps; and a correction module configured to correct the class activation map, and determine the focus area of each type of human body attribute based on a result of the correction.

In some embodiments, the generating sub-module may specifically include:

a processing unit configured to mirror the global heat map and the local heat maps respectively to obtain the processed global heat map and the processed local heat maps;

a generation unit configured to generate the mirrored class activation map of each type of human body attribute based on the processed global heat map and the processed local heat maps; and a determination unit configured to determine the focus area of each type of human body attribute according to the class activation map and the mirrored class activation map.

In some embodiments, the determination unit may specifically include:

an acquisition subunit configured to acquire feature points of the class activation map and feature points of the mirrored class activation map respectively to obtain a plurality of first feature points corresponding to the class activation map and a plurality of second feature points corresponding to the mirrored class activation map, each first feature point corresponding to a second feature point;

an extraction subunit configured to extract heat values of the first feature points to obtain first heat values corresponding to the first feature points, and extract heat values of the second feature points to obtain second heat values corresponding to the second feature points; and a construction subunit configured to construct the focus area of each type of human body attribute based on the first heat values and the second heat values.

In some embodiments, the construction subunit may be specifically configured to: detect whether each first heat value meets a preset condition, select a first feature point that meets the preset condition from the plurality of first feature points to obtain a first reference point, construct a first reference area of a human body attribute corresponding to the first reference point, acquire a second feature point corresponding to the first reference point to obtain a second reference point, construct a second reference area of a human body attribute corresponding to the second reference point, mirror the second reference area to obtain the processed second reference area, and adjust the size of the first reference area through the processed second reference area to obtain the focus area of the human body attribute.

In some embodiments, the generation sub-module may be specifically configured to: vectorize the global heat map to obtain a feature vector corresponding to the global heat map, and determine human body attributes focused by the local heat maps based on the distribution of the local heat maps in the global heat map, generate weight matrixes corresponding to the local heat maps according to the human body attributes focused by the local heat maps, calculate products of the feature vector and the weight matrixes respectively, and obtain the class activation map corresponding to each type of human body attribute.

The correction module 305 is configured to correct the recognition model by using the focus area, the human body attribute real values, and the human body attribute predicted values.

In some embodiments, the correction module may be specifically configured to calculate a loss function of the recognition model based on the human body attribute real values and the human body attribute predicted values to obtain a first loss function, acquire a loss function corresponding to the focus area through the recognition model to obtain a second loss function, superimpose the first loss function and the second loss function to obtain a target loss function of the recognition model, and correct the recognition model by using the target loss function.

The recognition module 306 is configured to perform human body attribute recognition on an image to be recognized based on the corrected recognition model.

For example, specifically, the recognition module 306 performs human body attribute recognition on the image to be recognized through the corrected recognition model, and obtains a human body attribute recognition result of a human body to be recognized in the image to be recognized.

In some embodiments, the recognition module 306 may be specifically configured to: acquire an image to be recognized containing a human body to be recognized, perform human body feature point recognition on the image to be recognized to obtain a first feature point set corresponding to the human body to be recognized, divide the human body to be recognized into areas based on the first feature point set to obtain a plurality of areas to be detected corresponding to the human body to be recognized, and perform human body attribute recognition on the plurality of areas to be detected respectively through the corrected recognition model.

In this embodiment of this application, after the acquisition module 301 acquires a human body image sample containing a plurality of areas to be detected, the areas to be detected being labeled with human body attribute real values, the generation module 302 generates a heat map of the human body image sample and heat maps of the areas to be detected through a recognition model to obtain a global heat map and local heat maps corresponding to the human body image sample. Then, the fusing module 303 fuses the global heat map and the local heat maps, and performs human body attribute recognition on the fused image to obtain human body attribute predicted values of the human body image sample. Then, the determination module 304 determines a focus area of each type of human body attribute according to the global heat map and the local heat maps. Then, the correction module 305 corrects the recognition model by using the focus area, the human body attribute real values, and the human body attribute predicted values. Finally, the recognition module 306 performs human body attribute recognition on an image to be recognized based on the corrected recognition model. The correction module 305 of this solution corrects the recognition model by using the focus area, the human body attribute real values, and the human body attribute predicted values, and the recognition module 306 then performs human body attribute recognition on the image to be recognized based on the corrected recognition model. In other words, when the human body attribute recognition is performed, the focus area of each type of human body attribute will be considered, so that each attribute can better focus on the area that it needs to focus on, thereby improving the accuracy of the human body attribute recognition.

In addition, an embodiment of this application further provides an electronic device. FIG. 4 is a schematic structural diagram of an electronic device according to an embodiment of this application. Specifically, the electronic device may include components such as a processor 401 with one or more processing cores, a memory 402 with one or more computer-readable storage media, a power supply 403, and an input unit 404. A person skilled in the art may understand that the electronic device structure shown in FIG. 4 does not constitute a limitation to the electronic device. The electronic device may include more or fewer components than those shown in the figure, or some components may be combined, or a different component deployment may be used The processor 401 is a control center of the electronic device, and connects various parts of the entire electronic device by using various interfaces and lines. By running or executing a software program and/or a module stored in the memory 402, and invoking data stored in the memory 402, the processor performs various functions of the electronic device and processes data, thereby performing overall monitoring on the electronic device. The processor 401 may include one or more processing cores. The processor 401 may integrate an application processor and a modem processor. The application processor mainly processes an operating system, a user interface, an application program, and the like. The modem processor mainly processes wireless communication. It can be understood that the foregoing modem processor may alternatively not be integrated into the processor 401.

The memory 402 may be configured to store a software program and module. The processor 401 runs the software program and module stored in the memory 402, to implement various functional applications and data processing. The memory 402 may mainly include a program storage area and a data storage area. The program storage area may store an operating system, an application program required by at least one function (such as a sound playing function and an image display function), and the like. The data storage area may store data created according to use of the server, and the like. In addition, the memory 402 may include a high speed random access memory, and may further include a non-volatile memory, such as at least one magnetic disk storage device, a flash memory, or another volatile solid-state storage device. Correspondingly, the memory 402 may further include a memory controller, to provide access of the processor 401 to the memory 402.

The electronic device further includes the power supply 403 for supplying power to the components. The power supply 403 may logically connect to the processor 401 by using a power supply management system, thereby implementing functions, such as charging, discharging, and power consumption management, by using the power supply management system. The power supply 403 may further include one or more direct current or alternating current power supplies, a re-charging system, a power failure detection circuit, a power supply converter or inverter, a power supply state indicator, and any other component.

The electronic device may further include the input unit 404. The input unit 404 may be configured to receive inputted numeric or character information and generate keyboard, mouse, joystick, optical, or trackball signal input related to user settings and function control.

Although not shown in the figure, the electronic device may further include a display unit, and the like. Details are not described herein again. Specifically, in this embodiment, the processor 401 in the electronic device may load executable files corresponding to processes of one or more application programs to the memory 402 according to the following instructions, and the processor 401 runs the application program stored in the memory 402, to implement various functions as follows:

acquiring a human body image sample containing a plurality of areas to be detected, the areas to be detected being labeled with human body attribute real values, generating, through a recognition model, a heat map of the human body image sample and heat maps of the areas to be detected to obtain a global heat map and local heat maps corresponding to the human body image sample; fusing the global heat map and the local heat map, and performing human body attribute recognition on the fused image to obtain human body attribute predicted values of the human body image sample; determining a focus area of each type of human body attribute according to the global heat map and local heat maps, correcting the recognition model by using the focus area, the human body attribute real values, and the human body attribute predicted values, and performing human body attribute recognition on an image to be recognized based on the corrected recognition model.

For specific implementation of the foregoing operations, reference may be made to the foregoing embodiments. Details are not described herein again.

In this embodiment of this application, after a human body image sample containing a plurality of areas to be detected is acquired, the areas to be detected being labeled with human body attribute real values, a heat map of the human body image sample and heat maps of the areas to be detected are generated through a recognition model to obtain a global heat map and local heat maps corresponding to the human body image sample; then the global heat map and the local heat maps are fused, and human body attribute recognition is performed on the fused image to obtain human body attribute predicted values of the human body image sample; then a focus area of each type of human body attribute is determined according to the global heat map and the local heat maps, the recognition model is corrected by using the focus area, the human body attribute real values, and the human body attribute predicted values, and finally, the human body attribute recognition is performed on the image to be recognized based on the corrected recognition model. In this solution, the recognition model is corrected by using the focus area, the human body attribute real values, and the human body attribute predicted values, and then the human body attribute recognition is performed on the image to be recognized based on the corrected recognition model. In other words, when the human body attribute recognition is performed, the focus area of each type of human body attribute will be considered, so that each attribute can better focus on the area that it needs to focus on, thereby improving the accuracy of the human body attribute recognition.

A person of ordinary skill in the art may understand that, all or some steps of the methods in the foregoing embodiments may be implemented by using instructions, or implemented through instructions controlling relevant hardware, and the instructions may be stored in a computer-readable memory and loaded and executed by a processor.

According to an aspect of this application, a computer program product or a computer program is provided, the computer program product or the computer program including computer instructions, the computer instructions being stored in a computer-readable storage medium. The processor of the electronic device reads the computer instructions from the computer-readable storage medium, and the processor executes the computer instructions, so that the electronic device performs the human body attribute recognition method provided in the above embodiment.

A storage medium storing a plurality of instructions is further provided in the embodiments of this application, and the instructions may be loaded by a processor to perform the operations in any of the human body attribute recognition methods according to the embodiments of this application. For example, the instructions may perform the following steps:

acquiring a human body image sample containing a plurality of areas to be detected, the areas to be detected being labeled with human body attribute real values, generating a heat map of the human body image sample and heat maps of the areas to be detected through a recognition model to obtain a global heat map and local heat maps corresponding to the human body image sample; fusing the global heat map and the local heat maps, and performing human body attribute recognition on the fused image to obtain human body attribute predicted values of the human body image sample; determining a focus area of each type of human body attribute according to the global heat map and local heat maps, correcting the recognition model by using the focus area, the human body attribute real values, and the human body attribute predicted values, and performing human body attribute recognition on an image to be recognized based on the corrected recognition model.

For specific implementation of the foregoing operations, reference may be made to the foregoing embodiments. Details are not described herein again.

The storage medium may include a read-only memory (ROM), a random access memory (RAM), a magnetic disk, an optical disc, or the like.

Because the instructions stored in the storage medium may perform the steps of any human body attribute recognition method provided in the embodiments of this application, the instructions can implement beneficial effects that may be implemented by any human body attribute recognition method provided in the embodiments of this application. For details, reference may be made to the foregoing embodiments. Details are not described herein again.

In this embodiment of this application, after a human body image sample containing a plurality of areas to be detected is acquired, the areas to be detected being labeled with human body attribute real values, a heat map of the human body image sample and heat maps of the areas to be detected are generated through a recognition model to obtain a global heat map and local heat maps corresponding to the human body image sample; then the global heat map and the local heat maps are fused, and human body attribute recognition is performed on the fused image to obtain human body attribute predicted values of the human body image sample; then a focus area of each type of human body attribute is determined according to the global heat map and local heat maps, the recognition model is corrected by using the focus area, the human body attribute real values, and the human body attribute predicted values, and finally, the human body attribute recognition is performed on an image to be recognized based on the corrected recognition model. Therefore, the solution can effectively improve the accuracy of the human body attribute recognition.

In various embodiments in the present disclosure, a unit may refer to a software unit, a hardware unit, or a combination thereof. A software unit may include a computer program or part of the computer program that has a predefined function and works together with other related parts to achieve a predefined goal, such as those functions described in this disclosure. A hardware unit may be implemented using processing circuitry and/or memory configured to perform the functions described in this disclosure. Each unit can be implemented using one or more processors (or processors and memory). Likewise, a processor (or processors and memory) can be used to implement one or more units. Moreover, each unit can be part of an overall unit that includes the functionalities of the unit. The description here also applies to the term unit and other equivalent terms.

In various embodiments in the present disclosure, a module may refer to a software module, a hardware module, or a combination thereof. A software module may include a computer program or part of the computer program that has a predefined function and works together with other related parts to achieve a predefined goal, such as those functions described in this disclosure. A hardware module may be implemented using processing circuitry and/or memory configured to perform the functions described in this disclosure. Each module can be implemented using one or more processors (or processors and memory). Likewise, a processor (or processors and memory) can be used to implement one or more modules. Moreover, each module can be part of an overall module that includes the functionalities of the module. The description here also applies to the term module and other equivalent terms.

A human body attribute recognition method, terminal and apparatus, an electronic device, and a storage medium provided in the embodiments of this application are described in detail above. The principle and implementations of this application are described herein by using specific examples. The descriptions of the foregoing embodiments are merely used for helping understand the method and core ideas of this application. In addition, a person skilled in the art can make changes to this application in terms of the specific implementations and application scopes according to the ideas of this application. Therefore, the content of this specification shall not be construed as a limitation on this application.

What is claimed is:

1. A method for recognizing human body attributes, the method comprising:

acquiring, by a device comprising a memory storing instructions and a memory in communication with the memory, a sample image of human body, the sample image containing a plurality of to-be-detected areas, the to-be-detected areas being labeled with true values of human body attributes;

generating, by the device through a recognition model, a heat map of the sample image and heat maps of the to-be-detected areas to obtain a global heat map and local heat maps corresponding to the sample image;

fusing, by the device, the global heat map and the local heat maps to obtain a fused image, and performing human body attribute recognition on the fused image to obtain predicted values of human body attribute of the sample image;

determining, by the device, a focus area of each type of human body attribute according to the global heat map and the local heat maps;

correcting, by the device, the recognition model according to a target loss function based on the focus area, the true values of human body attributes, and the predicted values of human body attributes; and performing, by the device based on the corrected recognition model, human body attribute recognition on a to-be-recognized image.

2. The method according to claim 1, wherein the determining the focus area of each type of human body attribute according to the global heat map and the local heat maps comprises:

generating a class activation map corresponding to each type of human body attribute according to the global heat map and the local heat maps; and correcting the class activation map, and determining the focus area of each type of human body attribute based on a result of the correction.

3. The method according to claim 2, wherein the correcting the class activation map, and determining the focus area of each type of human body attribute based on the result of the correction comprises:

mirroring the global heat map and the local heat maps respectively to obtain a mirrored global heat map and mirrored local heat maps;

generating a mirrored class activation map of each type of human body attribute based on the mirrored global heat map and the mirrored local heat maps; and determining the focus area of each type of human body attribute according to the class activation map and the mirrored class activation map.

4. The method according to claim 3, wherein the determining the focus area of each type of human body attribute according to the class activation map and the mirrored class activation map comprises:

obtaining a plurality of first feature points corresponding to the class activation map and a plurality of second feature points corresponding to the mirrored class activation map, each first feature point corresponding to a second feature point;

extracting heat values of the first feature points to obtain first heat values corresponding to the first feature points;

extracting heat values of the second feature points to obtain second heat values corresponding to the second feature points; and constructing the focus area of each type of human body attribute based on the first heat values and the second heat values.

5. The method according to claim 4, wherein the constructing the focus area of each type of human body attribute based on the first heat values and the second heat values comprises:

determining whether each first heat value meets a preset condition; and in response to determining that a first feature point meets the preset condition:

selecting the first feature point that meets the preset condition from the plurality of first feature points to obtain a first reference point;

constructing a first reference area of a human body attribute corresponding to the first reference point;

acquiring a second feature point corresponding to the first reference point to obtain a second reference point;

constructing a second reference area of a human body attribute corresponding to the second reference point;

mirroring the second reference area to obtain a mirrored second reference area; and adjusting a size of the first reference area by using the mirrored second reference area to obtain the focus area of the human body attribute.

6. The method according to claim 2, wherein the generating the class activation map corresponding to each type of human body attribute according to the global heat map and the local heat maps comprises:

vectorizing the global heat map to obtain a feature vector corresponding to the global heat map;

determining, based on distribution of the local heat maps in the global heat map, human body attributes focused by the local heat maps;

generating weight matrixes corresponding to the local heat maps according to the human body attributes focused by the local heat maps; and calculating products of the feature vector and the weight matrixes respectively to obtain the class activation map corresponding to each type of human body attribute.

7. The method according to claim 1, wherein the correcting the recognition model according to the target loss function based on the focus area, the true values of human body attributes, and the human body attribute predicted values comprises:

calculating a first loss function of the recognition model based on the true values of human body attributes and predicted values of human body attributes;

acquiring a second loss function corresponding to the focus area through the recognition model;

superimposing the first loss function and the second loss function to obtain the target loss function of the recognition model; and correcting the recognition model according to the target loss function.

8. An apparatus for recognizing human body attributes, the apparatus comprising:

a memory storing instructions; and a processor in communication with the memory, wherein, when the processor executes the instructions, the processor is configured to cause the apparatus to perform:

acquiring a sample image of human body, the sample image containing a plurality of to-be-detected areas, the to-be-detected areas being labeled with true values of human body attributes, generating, through a recognition model, a heat map of the sample image and heat maps of the to-be-detected areas to obtain a global heat map and local heat maps corresponding to the sample image, fusing the global heat map and the local heat maps to obtain a fused image, and performing human body attribute recognition on the fused image to obtain predicted values of human body attribute of the sample image, determining a focus area of each type of human body attribute according to the global heat map and the local heat maps, correcting the recognition model according to a target loss function based on the focus area, the true values of human body attributes, and the predicted values of human body attributes, and performing, based on the corrected recognition model, human body attribute recognition on a to-be-recognized image.

9. The apparatus according to claim 8, wherein, when the processor is configured to cause the apparatus to perform determining the focus area of each type of human body attribute according to the global heat map and the local heat maps, the processor is configured to cause the apparatus to perform:

generating a class activation map corresponding to each type of human body attribute according to the global heat map and the local heat maps; and correcting the class activation map, and determining the focus area of each type of human body attribute based on a result of the correction.

10. The apparatus according to claim 9, wherein, when the processor is configured to cause the apparatus to perform correcting the class activation map, and determining the focus area of each type of human body attribute based on the result of the correction, the processor is configured to cause the apparatus to perform:

mirroring the global heat map and the local heat maps respectively to obtain a mirrored global heat map and mirrored local heat maps;

generating a mirrored class activation map of each type of human body attribute based on the mirrored global heat map and the mirrored local heat maps; and determining the focus area of each type of human body attribute according to the class activation map and the mirrored class activation map.

11. The apparatus according to claim 10, wherein, when the processor is configured to cause the apparatus to perform determining the focus area of each type of human body attribute according to the class activation map and the mirrored class activation map, the processor is configured to cause the apparatus to perform:

obtaining a plurality of first feature points corresponding to the class activation map and a plurality of second feature points corresponding to the mirrored class activation map, each first feature point corresponding to a second feature point;

extracting heat values of the first feature points to obtain first heat values corresponding to the first feature points;

extracting heat values of the second feature points to obtain second heat values corresponding to the second feature points; and constructing the focus area of each type of human body attribute based on the first heat values and the second heat values.

12. The apparatus according to claim 11, wherein, when the processor is configured to cause the apparatus to perform constructing the focus area of each type of human body attribute based on the first heat values and the second heat values, the processor is configured to cause the apparatus to perform:

determining whether each first heat value meets a preset condition; and in response to determining that a first feature point meets the preset condition:

selecting the first feature point that meets the preset condition from the plurality of first feature points to obtain a first reference point;

constructing a first reference area of a human body attribute corresponding to the first reference point;

acquiring a second feature point corresponding to the first reference point to obtain a second reference point;

constructing a second reference area of a human body attribute corresponding to the second reference point;

mirroring the second reference area to obtain a mirrored second reference area; and adjusting a size of the first reference area by using the mirrored second reference area to obtain the focus area of the human body attribute.

13. The apparatus according to claim 9, wherein, when the processor is configured to cause the apparatus to perform generating the class activation map corresponding to each type of human body attribute according to the global heat map and the local heat maps, the processor is configured to cause the apparatus to perform:

vectorizing the global heat map to obtain a feature vector corresponding to the global heat map;

determining, based on distribution of the local heat maps in the global heat map, human body attributes focused by the local heat maps;

generating weight matrixes corresponding to the local heat maps according to the human body attributes focused by the local heat maps; and calculating products of the feature vector and the weight matrixes respectively to obtain the class activation map corresponding to each type of human body attribute.

14. The apparatus according to claim 8, wherein, when the processor is configured to cause the apparatus to perform correcting the recognition model according to the target loss function based on the focus area, the true values of human body attributes, and the human body attribute predicted values, the processor is configured to cause the apparatus to perform:

calculating a first loss function of the recognition model based on the true values of human body attributes and predicted values of human body attributes;

acquiring a second loss function corresponding to the focus area through the recognition model;

superimposing the first loss function and the second loss function to obtain the target loss function of the recognition model; and correcting the recognition model according to the target loss function.

15. A non-transitory computer-readable storage medium storing computer-readable instructions, wherein, the computer-readable instructions, when executed by a processor, are configured to cause the processor to perform:

acquiring a sample image of human body, the sample image containing a plurality of to-be-detected areas, the to-be-detected areas being labeled with true values of human body attributes;

generating, through a recognition model, a heat map of the sample image and heat maps of the to-be-detected areas to obtain a global heat map and local heat maps corresponding to the sample image;

fusing the global heat map and the local heat maps to obtain a fused image, and performing human body attribute recognition on the fused image to obtain predicted values of human body attribute of the sample image;

determining a focus area of each type of human body attribute according to the global heat map and the local heat maps;

correcting the recognition model according to a target loss function based on the focus area, the true values of human body attributes, and the predicted values of human body attributes; and performing, based on the corrected recognition model, human body attribute recognition on a to-be-recognized image.

16. The non-transitory computer-readable storage medium according to claim 15, wherein, when the computer-readable instructions are configured to cause the processor to perform determining the focus area of each type of human body attribute according to the global heat map and the local heat maps, the computer-readable instructions are configured to cause the processor to perform:

generating a class activation map corresponding to each type of human body attribute according to the global heat map and the local heat maps; and correcting the class activation map, and determining the focus area of each type of human body attribute based on a result of the correction.

17. The non-transitory computer-readable storage medium according to claim 16, wherein, when the computer-readable instructions are configured to cause the processor to perform correcting the class activation map, and determining the focus area of each type of human body attribute based on the result of the correction, the computer-readable instructions are configured to cause the processor to perform:

mirroring the global heat map and the local heat maps respectively to obtain a mirrored global heat map and mirrored local heat maps;

generating a mirrored class activation map of each type of human body attribute based on the mirrored global heat map and the mirrored local heat maps; and determining the focus area of each type of human body attribute according to the class activation map and the mirrored class activation map.

18. The non-transitory computer-readable storage medium according to claim 17, wherein, when the computer-readable instructions are configured to cause the processor to perform determining the focus area of each type of human body attribute according to the class activation map and the mirrored class activation map, the computer-readable instructions are configured to cause the processor to perform:

obtaining a plurality of first feature points corresponding to the class activation map and a plurality of second feature points corresponding to the mirrored class activation map, each first feature point corresponding to a second feature point;

extracting heat values of the first feature points to obtain first heat values corresponding to the first feature points;

extracting heat values of the second feature points to obtain second heat values corresponding to the second feature points; and constructing the focus area of each type of human body attribute based on the first heat values and the second heat values.

19. The non-transitory computer-readable storage medium according to claim 18, wherein, when the computer-readable instructions are configured to cause the processor to perform constructing the focus area of each type of human body attribute based on the first heat values and the second heat values, the computer-readable instructions are configured to cause the processor to perform:

determining whether each first heat value meets a preset condition; and in response to determining that a first feature point meets the preset condition:
- selecting the first feature point that meets the preset condition from the plurality of first feature points to obtain a first reference point;
- constructing a first reference area of a human body attribute corresponding to the first reference point;
- acquiring a second feature point corresponding to the first reference point to obtain a second reference point;
- constructing a second reference area of a human body attribute corresponding to the second reference point;
- mirroring the second reference area to obtain a mirrored second reference area; and
- adjusting a size of the first reference area by using the mirrored second reference area to obtain the focus area of the human body attribute.

20. The non-transitory computer-readable storage medium according to claim 16, wherein, when the computer-readable instructions are configured to cause the processor to perform generating the class activation map corresponding to each type of human body attribute according to the global heat map and the local heat maps, the computer-readable instructions are configured to cause the processor to perform:
- vectorizing the global heat map to obtain a feature vector corresponding to the global heat map;
- determining, based on distribution of the local heat maps in the global heat map, human body attributes focused by the local heat maps;
- generating weight matrixes corresponding to the local heat maps according to the human body attributes focused by the local heat maps; and
- calculating products of the feature vector and the weight matrixes respectively to obtain the class activation map corresponding to each type of human body attribute.

* * * * *